United States Patent
Wilson et al.

(10) Patent No.: US 10,690,168 B2
(45) Date of Patent: Jun. 23, 2020

(54) THREE-POINT FASTENER

(71) Applicant: Maclean-Fogg Company, Mundelein, IL (US)

(72) Inventors: Larry J. Wilson, Commerce Township, MI (US); James T. Tanner, White Lake, MI (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 0 days.

(21) Appl. No.: 15/487,805

(22) Filed: Apr. 14, 2017

(65) Prior Publication Data

US 2018/0298933 A1     Oct. 18, 2018

(51) Int. Cl.
    *F16B 23/00*    (2006.01)
    *F16B 37/14*    (2006.01)

(52) U.S. Cl.
    CPC ...... *F16B 23/0038* (2013.01); *F16B 23/0007* (2013.01); *F16B 23/0092* (2013.01); *F16B 37/14* (2013.01)

(58) Field of Classification Search
CPC ... F16B 23/0038; F16B 23/0007; F16B 23/00
USPC ........................................................ 411/402
See application file for complete search history.

(56) References Cited

U.S. PATENT DOCUMENTS

| | | | |
|---|---|---|---|
| 2,248,695 A | 7/1941 | Bradshaw | |
| 2,248,696 A | 7/1941 | Bradshaw | |
| 2,969,250 A | 1/1961 | Kull | |
| 3,003,379 A * | 10/1961 | Pribitzer | B25B 13/02 411/427 |
| 3,396,765 A | 8/1968 | Ridenour | |
| 3,456,548 A | 7/1969 | Schmidt et al. | |
| 3,584,667 A | 6/1971 | Reiland | |
| 3,885,480 A | 5/1975 | Muenchinger | |
| 4,006,660 A | 2/1977 | Yamamoto et al. | |
| 4,073,160 A * | 2/1978 | Perret | B25B 13/065 411/403 |
| 4,260,005 A | 4/1981 | Stencel | |
| 4,361,412 A * | 11/1982 | Stolarczyk | F16B 23/0007 411/402 |
| 4,459,074 A | 7/1984 | Capuano | |
| 4,938,731 A | 7/1990 | Nguyen et al. | |
| 5,019,080 A | 5/1991 | Hemer | |
| 5,324,149 A * | 6/1994 | Bainbridge | F16B 37/14 411/377 |
| 5,378,101 A | 1/1995 | Olson et al. | |

(Continued)

FOREIGN PATENT DOCUMENTS

| | | |
|---|---|---|
| DE | 297 09 124 | 7/1997 |
| DE | 203 21 249 U1 | 10/2006 |

(Continued)

OTHER PUBLICATIONS

"Torx Plus Drive System;" Infastech Intellectual Properties Pte. Ltd.; 2011; 15p; Decorah, IA.

(Continued)

*Primary Examiner* — Flemming Saether
(74) *Attorney, Agent, or Firm* — Brooks Kushman P.C.

(57) ABSTRACT

Fasteners are disclosed for reducing mass of the fastener, while being configured for use with standard torque delivery tools. The fasteners include non-torque bearing surfaces disposed between torque bearing surfaces.

15 Claims, 6 Drawing Sheets

(56) References Cited

U.S. PATENT DOCUMENTS

| | | | |
|---|---|---|---|
| 5,577,871 A | 11/1996 | Brugola | |
| 5,628,602 A * | 5/1997 | Ohsawa | F16B 23/0061 |
| | | | 411/405 |
| 5,674,036 A | 10/1997 | Hsieh | |
| 5,772,377 A | 6/1998 | Bydalek | |
| 6,343,531 B2 | 2/2002 | Amis | |
| 6,632,057 B1 | 10/2003 | Fauchet | |
| 6,655,888 B2 | 12/2003 | Schultz | |
| 6,736,580 B2 | 5/2004 | Schultz | |
| 7,073,416 B2 | 7/2006 | Kozak et al. | |
| 7,108,510 B2 | 9/2006 | Niznick | |
| 7,128,513 B2 | 10/2006 | Walker | |
| 7,207,248 B2 | 4/2007 | Panasik et al. | |
| 7,225,710 B2 | 6/2007 | Pacheco, Jr. | |
| 7,331,743 B2 | 2/2008 | Schultz | |
| 7,331,744 B2 | 2/2008 | Schultz | |
| 7,568,872 B2 | 8/2009 | Schultz | |
| 7,857,563 B2 | 12/2010 | Pratt | |
| 8,291,795 B2 | 10/2012 | Hughes et al. | |
| 8,429,875 B2 | 4/2013 | Bartlett | |
| 8,491,247 B2 * | 7/2013 | Wilson | F16B 23/0038 |
| | | | 411/337 |
| 8,616,097 B2 | 12/2013 | Hughes et al. | |
| 8,747,044 B2 | 6/2014 | Garver | |
| 8,997,608 B2 | 4/2015 | Merrick | |
| 9,138,873 B2 | 9/2015 | Merrick | |
| 9,278,434 B2 | 3/2016 | Merrick | |
| 9,644,660 B2 | 5/2017 | Garver | |
| 9,662,775 B2 | 5/2017 | Merrick | |
| 9,868,188 B2 | 1/2018 | Merrick | |
| 9,957,993 B2 | 5/2018 | Pritchard | |
| 9,964,133 B2 | 5/2018 | Bjelobradic et al. | |
| 2003/0044257 A1 | 3/2003 | Siegel et al. | |
| 2003/0158555 A1 | 8/2003 | Sanders et al. | |
| 2006/0062650 A1 | 3/2006 | Keener | |
| 2009/0220321 A1 | 9/2009 | Sakamura | |
| 2009/0285653 A1 | 11/2009 | Schultz | |
| 2011/0070051 A1 * | 3/2011 | Chang | F16B 23/0092 |
| | | | 411/405 |
| 2013/0286668 A1 | 10/2013 | Ishida et al. | |
| 2015/0343615 A1 | 12/2015 | Merrick | |
| 2016/0131170 A1 | 5/2016 | Landsmann | |
| 2016/0252125 A1 | 9/2016 | Lares | |
| 2016/0273591 A1 | 9/2016 | Goss | |
| 2016/0312816 A1 | 10/2016 | Bjelobradic et al. | |
| 2017/0050300 A1 | 2/2017 | Lukes et al. | |
| 2018/0003241 A1 | 1/2018 | Goss | |
| 2018/0193986 A1 | 7/2018 | Tissieres | |
| 2018/0298933 A1 | 10/2018 | Wilson et al. | |

FOREIGN PATENT DOCUMENTS

| | | |
|---|---|---|
| DE | 10 2011 012 994 | 9/2012 |
| DE | 10 2013 021 238 | 6/2015 |
| EP | 0 926 362 A1 | 6/1999 |
| EP | 0 961 042 A1 | 12/1999 |
| EP | 1 162 376 | 12/2001 |
| EP | 1 632 683 | 3/2006 |
| EP | 2 022 992 | 2/2009 |
| EP | 2 363 245 | 9/2011 |
| EP | 1 765 214 | 5/2016 |
| EP | 3 115 153 | 1/2017 |
| EP | 3 388 694 | 10/2018 |
| FR | 1 309 208 | 11/1962 |
| FR | 2 361 568 | 3/1978 |
| GB | 1564 684 | 2/1978 |
| WO | WO 2003/062650 | 7/2003 |
| WO | WO 2003/068093 | 8/2003 |
| WO | WO 2004/005731 | 1/2004 |
| WO | WO 2005/082641 A1 | 9/2005 |
| WO | WO 20056/082641 A1 | 9/2005 |
| WO | WO 2006/130490 | 12/2006 |
| WO | WO 2010/014881 | 2/2010 |
| WO | WO 2015/086196 | 6/2015 |
| WO | WO 2016/149526 | 9/2016 |

OTHER PUBLICATIONS

Rudd, Matthew; Patentability Search for "Hybrid 6-Lobe—Hex Nut/Bolt;" Cardinal Intellectual Property; Nov. 23, 2016; 11p; Evanston, IL.

European Search Report for EP Application No. 18165826.1 dated Sep. 6, 201 (8 pgs.).

* cited by examiner

SECTION A-A

//THREE-POINT FASTENER

BACKGROUND

The present invention relates generally to fasteners and more particularly to a three-point fastener for transmitting torque from a tool to the fastener.

Fasteners are used in numerous applications to attach various components together. Typically, a fastener has at least a threaded portion and one or more bearing surfaces attached thereto. The bearing surfaces are designed to receive torque from a tool, such as a socket or wrench, which is used to tighten or loosen the fastener. In a conventional fastener, such as a nut, the fastener may have internal threads and six bearing surfaces oriented in a hexagon shape around the internal threads. However, other fasteners may have external threads, such as bolts and screws.

The most common shape of a tool to apply torque to threaded fasteners is a hexagon or hexagon-like geometry socket. Accordingly, many fasteners have a hexagon shape. Applying torque with a hexagon or hexagon-like geometry socket to fasteners creates contact between the socket and fastener at six places, namely, at or near each corner of the hexagon fastener. In contrast, a standard open-end wrench applies torque to fasteners at two places, namely, at opposite corners of the hexagon fastener. This common usage of open-end wrenches with hexagon fasteners demonstrates the strength that exists in hexagon fasteners at the torque bearing surfaces.

To meet ever increasing global demands for energy efficiency, automobile manufacturers have expressed the need to reduce the mass of vehicles to help meet government requirements for increasing fuel efficiency. The inventor believes the design of fasteners can be improved to lower weight, while maintaining the highest industry standards for durability and function.

SUMMARY

In one embodiment, a fastener comprises a threaded portion and a bearing portion. The bearing portion includes three bearing surfaces designed to receive torque from a tool and transmit torque to the threaded portion. Each bearing surface includes two adjacent sides with an edge disposed between them. The bearing portion also includes three non-bearing surfaces located between each of the bearing surfaces.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

A standard hexagon shaped fastener includes a torque bearing surface with six sides that intersect at the six corners of the hexagon to create six edges between the six sides. The angle at each corner is approximately 120 degrees.

Figure 1:
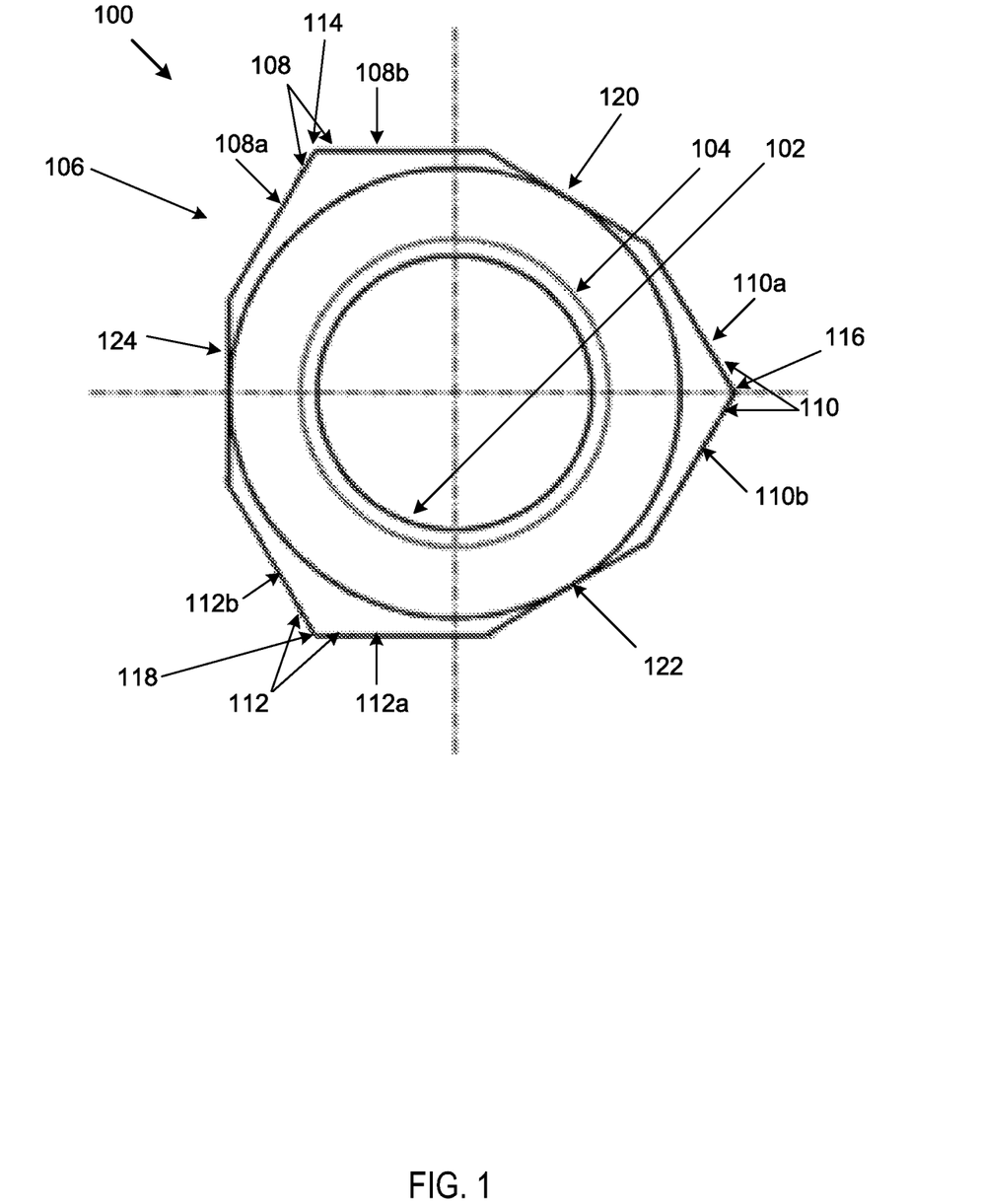
FIG. 1 is a top view of a first fastener embodiment.

Referring now to the figures, FIG. 1 shows an embodiment of an improved fastener. Fastener 100 has a threaded portion 102. Threaded portion 102 may surround an opening extending along the axial length of fastener 100 (into the page of FIG. 1). Fastener 100 may be a nut or any other fastener with internal threads. Alternatively, fastener 100 may be a bolt or any other fastener with external threads (not shown). Threaded portion 102 may include internal threads with a major diameter 104 shown with a dotted line.

Fastener 100 may include a torque bearing portion 106. The torque bearing portion 106 may extend the entire axial length of fastener 100 or may only extend along part of the axial length of fastener 100. Bearing portion 106 may include three torque bearing surfaces 108, 110, 112 that may be designed to receive torque from a tool, such as a socket or wrench, and transmit torque to the threaded portion 102.

Each torque bearing surface 108, 110, 112 may include two torque bearing sides with an edge 114, 116, 118 between the sides. Torque bearing surface 108 may include torque bearing sides 108a and 108b with edge 114 between the sides. Torque bearing surface 110 may include torque bearing sides 110a and 110b with edge 116 between the sides. Torque bearing surface 112 may include torque bearing sides 112a and 112b with edge 118 between the sides. The height of each torque bearing side 108a, 108b, 110a, 110b, 112a, 112b may be the height of the bearing portion 106 in an axial direction. Each torque bearing side 108a, 108b, 110a, 110b, 112a, 112b may be designed to receive torque from a tool, such as a socket or wrench, and transmit the torque to the threaded portion 102 depending if the tool is tightening or loosening fastener 100. For example, if the tool is tightening fastener 100, torque bearing sides 108a, 110a, 112a may receive torque from the tool and transfer the torque to the threaded portion 102. Whereas if the tool is loosening fastener 100, torque bearing sides 108b, 110b, 112b may receive torque from the tool and transfer the torque to the threaded portion 102. The torque bearing side that receives and transfers torque when fastener 100 is being tightened or loosened may be switched depending on the direction of the threads in threaded portion 102.

Edges 114, 116, 118 may extend the entire axial length of bearing portion 106. Edges 114, 116, 118 may be located at the mid-point of torque bearing surface 108, 110, 112, respectively, such that the widths of each corresponding torque bearing side 108a, 108b, 110a, 110b, 112a, 112b are the same. For example, the widths of torque bearing sides 108a and 108b may be the same. Alternatively, the widths of any or all of the torque bearing sides may be different than any or all of the other torque bearing sides.

Fastener 100 may be designed and shaped to be driven by standard socket tools, such as a hexagon socket or a 12 point configuration socket. Accordingly, the angle at edges 114, 116, 118 where the torque bearing sides intersect may be approximately 120 degrees to match the angle of a standard hexagon shaped socket. Additionally, the edges 114, 116, 118 may be equally spaced around the longitudinal axis of fastener 100 to match a standard hexagon shaped socket.

Bearing portion 106 may also include three non-torque bearing surfaces 120, 122, 124. The non-torque bearing surfaces 120, 122, 124 may not be intended to receive and transfer torque from a tool to the threaded portion 102. The non-torque bearing surfaces 120, 122, 124 may, however, incidentally receive and transfer torque from a tool to the threaded portion 102 even if the non-torque bearing surfaces 120, 122, 124 are not intended to do so.

The non-torque bearing surfaces 120, 122, 124 may be located adjacent to and between the torque bearing surface 108, 110, 112 such that torque bearing surface 108, 110, 112 are not adjacent to each other. The non-torque bearing surfaces 120, 122, 124 may be flat. The non-torque bearing surfaces 120, 122, 124 may extend the entire axial length of bearing portion 106.

Fastener 100 may have a reduced mass compared to a standard fastener of similar size designed for the same application as fastener 100. The reduce mass of fastener 100 may be due to the presence of the non-torque bearing surfaces 120, 122, 124 in place of torque bearing corners that would be located on standard fasteners. For example, the mass reduction of fastener 100 over an M12×1.75 thread× 19.0 mm across flats×12.0 mm high standard hexagon nut would be between 9-11%, and preferable approximately 11% plus or minus 0.5%. In grams mass, this is a reduction from 18.3 to 16.9 grams.

Figure 2:
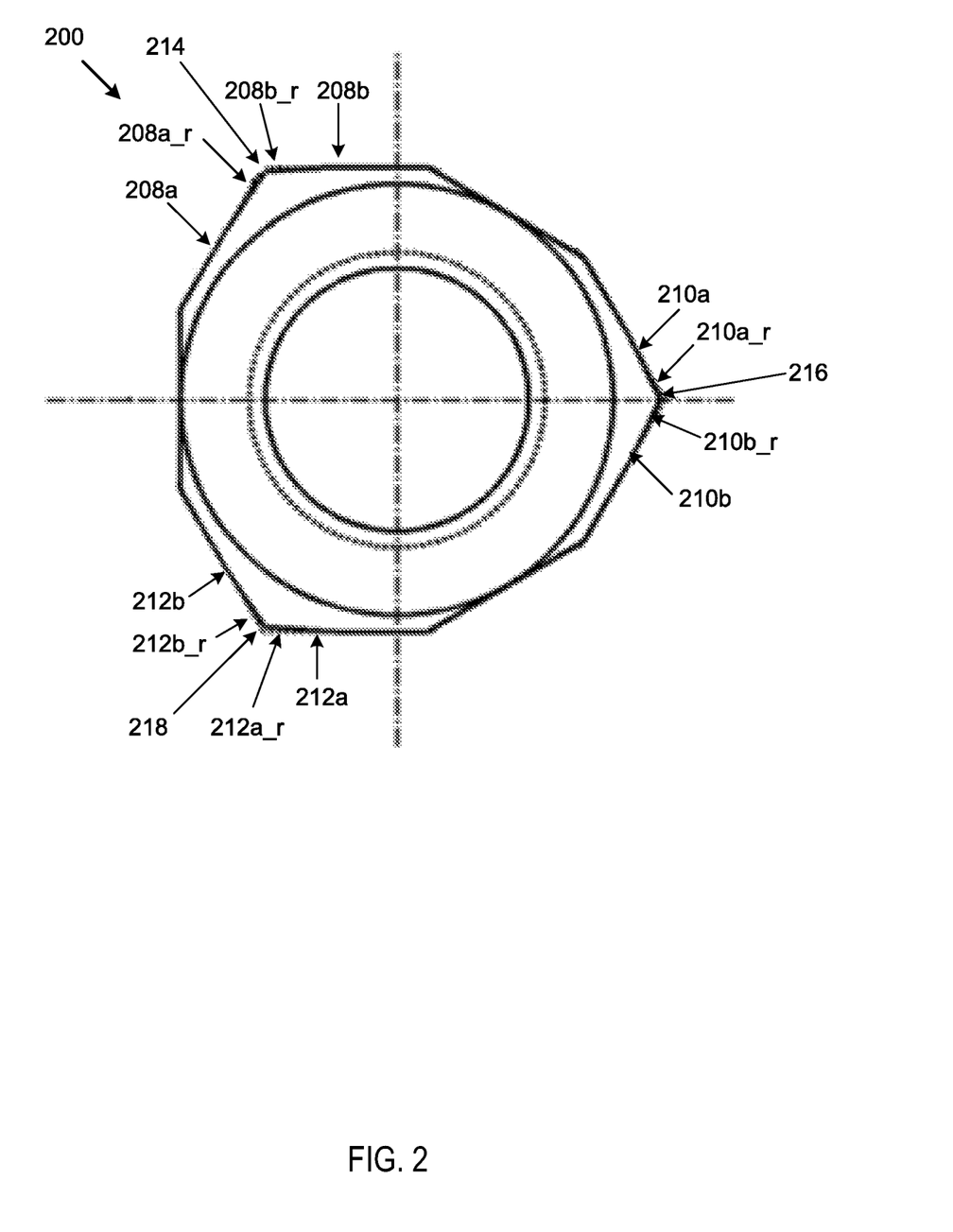
FIG. 2 is a top view of a second fastener embodiment.

FIG. 2 shows another embodiment of an improved fastener. Fastener 200 may have the same features and components as fastener 100. Fastener 200 may include angles at edges 214, 216, 218 that are different than 120 degrees, but fastener 200 may still be driven by standard socket tools, such as a hexagon socket or a 12 point configuration socket. For example, the angles at edges 214, 216, 218 of fastener 200 may be 126 to 130 degrees.

Figure 3:
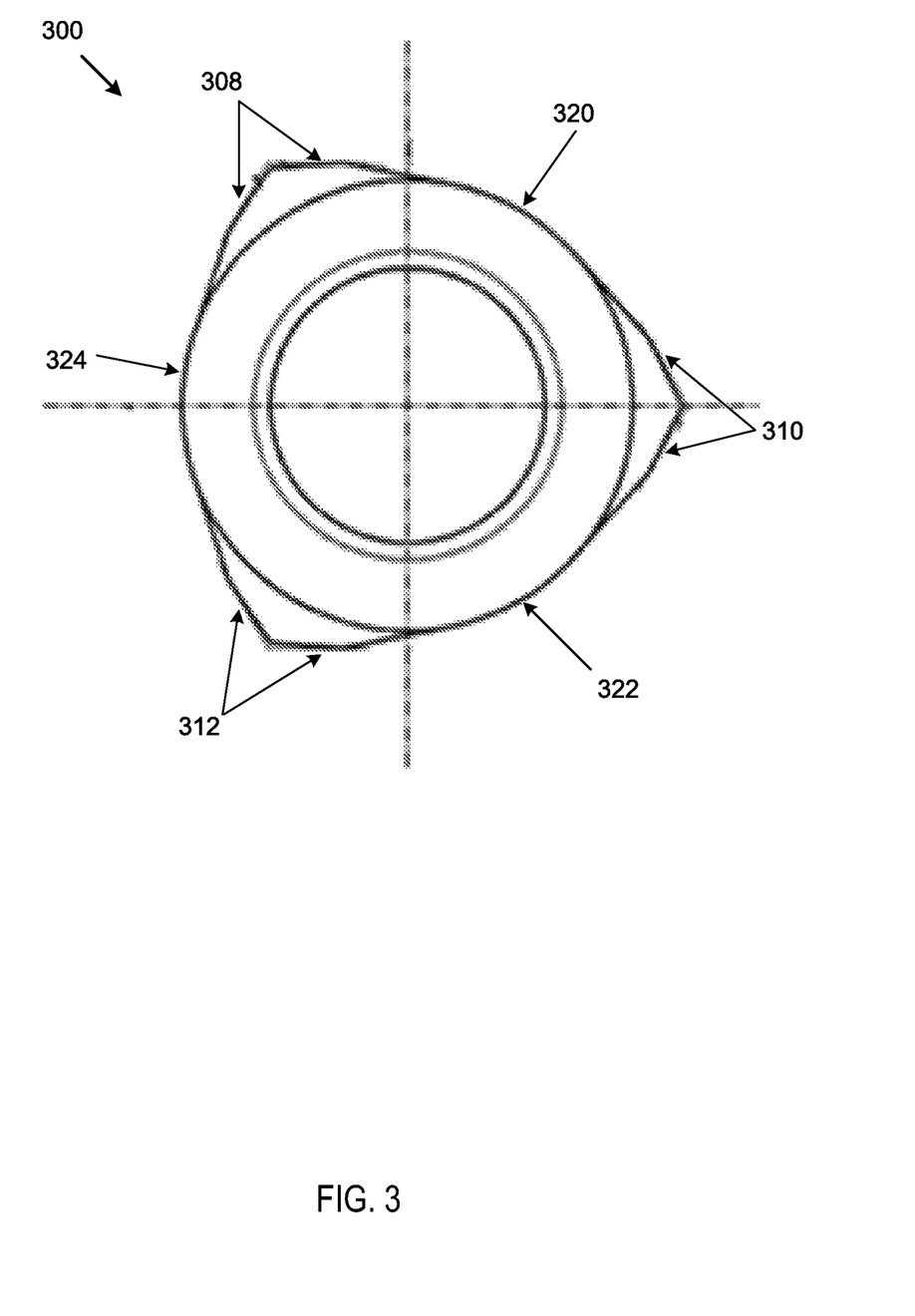
FIG. 3 is a top view of a third fastener embodiment.

The increased angles at edges 214, 216, 218 of fastener 200, in comparison to the angles of fastener 100, may be caused by recessed regions 208a_r, 208b_r, 210a_r, 210b_r, 212a_r, 212b_r of the torque bearing sides 208a, 208b, 210a, 210b, 212a, 212b adjacent to edges 214, 216, 218, as shown by the space within the dotted line in FIG. 2. The recessed regions 208a_r, 208b_r, 210a_r, 210b_r, 212a_r, 212b_r of the torque bearing sides are disposed inwardly from an imaginary plane defined by the remainder of the torque bearing sides 208a, 208b, 210a, 210b, 212a, 212b. The recessed bearing surfaces and increased angle at edges 214, 216, 218 may reduce deformation of the torque bearing surface 208, 210, 212 at edges 214, 216, 218 compared to fastener 100 because the initial contact between a standard socket tool and the recessed regions 208a_r, 208b_r, 210a_r, 210b_r, 212ar, 212b_r of the torque bearing sides occurs along a generally parallel plane to the initial contact area, which is significantly larger than the initial contact area with fastener 100. As a result, the initial pressure generated by the applied torque is less and may cause less deformation of the fastener 200. The recessed bearing surfaces and increased angle at edges 214, 216, 218 are described in U.S. Pat. No. 8,491,247, which is incorporated herein by reference in its entirety. 100241 FIG. 3 shows another embodiment of an improved fastener. Fastener 300 may have the same features and components as fasteners 100 and 200. Fastener 300 may include modified torque bearing surfaces 308, 310, 312 and modified non-torque bearing surfaces 320, 322, 324, as compared to fasteners 100 and 200. Fastener 300 may still be driven by standard socket tools, such as a hexagon socket or a 12 point configuration socket. In fastener 300, torque bearing surfaces 308, 310, 312 and non-torque bearing surfaces 320, 322, 324 may be curved and may be smoothly contoured into each other in order to reduce the mass of fastener 300. As shown in FIG. 3, the torque bearing surfaces 308, 310, 312 adjacent to non-torque bearing surfaces 320, 322, 324 have been reduced in size such that there is a smooth transition to the non-torque bearing surfaces 320, 322, 324 instead of a sharp corner, as in FIG. 1. Similarly, non-torque bearing surfaces 320, 322, 324 have been curved to smoothly transition to the torque bearing surfaces 308, 310, 312.

Fastener 300 may have a reduced mass compared to a standard fastener of similar size due to the modified torque bearing surfaces 308, 310, 312 and modified non-torque bearing surfaces 320, 322, 324. For example, the mass reduction of fastener 300 may be approximately 17% compared to a standard fastener of similar size designed for the same application as fastener 300. The size reduction and/or curvature of torque bearing surfaces 308, 310, 312 and non-torque bearing surfaces 320, 322, 324 may be adjusted to increase or decrease the mass reduction of fastener 300.

Figure 4:
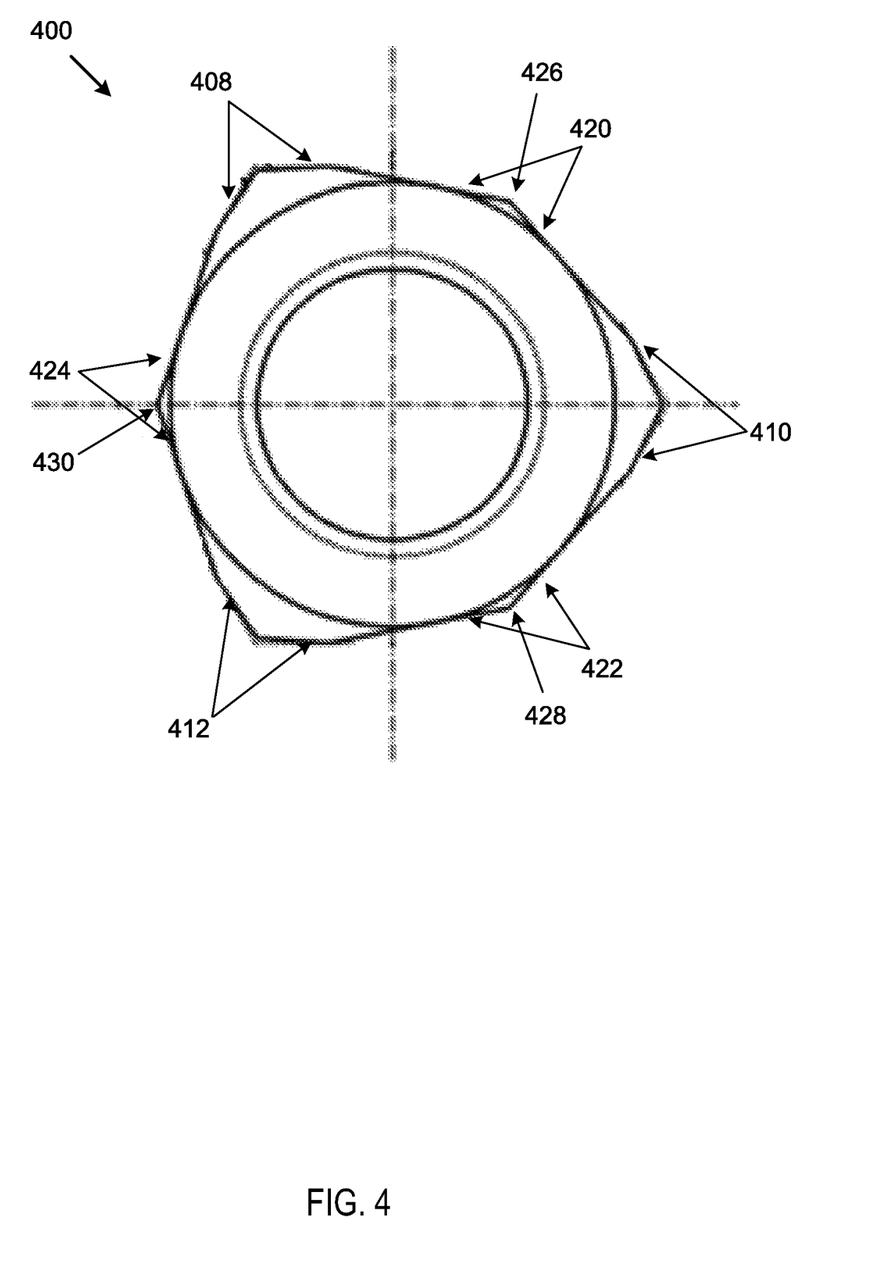
FIG. 4 is a top view of a fourth fastener embodiment.

FIG. 4 shows another embodiment of an improved fastener. Fastener 400 may have the same features and components as fasteners 100, 200, and 300. Similar to fastener 300, fastener 400 may include modified torque bearing surfaces 408, 410, 412 and modified non-torque bearing surfaces 420, 422, 424, as compared to fasteners 100 and 200. Fastener 400 may still be driven by standard socket tools, such as a hexagon socket or a 12 point configuration socket. In fastener 400, torque bearing surfaces 408, 410, 412 and non-torque bearing surfaces 420, 422, 424 may be angled toward each other in order to reduce the mass of fastener 400. As shown in FIG. 4, the torque bearing surfaces 408, 410, 412 adjacent to non-torque bearing surfaces 420, 422, 424 have been reduced in size and angled such that there is a smooth transition to the non-torque bearing surfaces 420, 422, 424 instead of a sharp corner, as in FIG. 1. Similarly, non-torque bearing surfaces 420, 422, 424 have been angled to smoothly transition to the torque bearing surfaces 408, 410, 412. Non-torque bearing surfaces 420, 422, 424 may include edges 426, 428, 430 as a result of the angles of non-torque bearing surfaces 420, 422, 424.

Fastener 400 may have a reduced mass compared to a standard fastener of similar size due to the modified torque bearing surfaces 408, 410, 412 and modified non-torque bearing surfaces 420, 422, 424. The mass reduction of fastener 400 may be less than the mass reduction of fastener 300 due to the angles of torque bearing surfaces 408, 410, 412 and non-torque bearing surfaces 420, 422, 424. The angles of torque bearing surfaces 408, 410, 412 and non-torque bearing surfaces 420, 422, 424 may be adjusted to increase or decrease the mass reduction of fastener 400.

Figures 5, 5A, 5B, 5C, 5D:
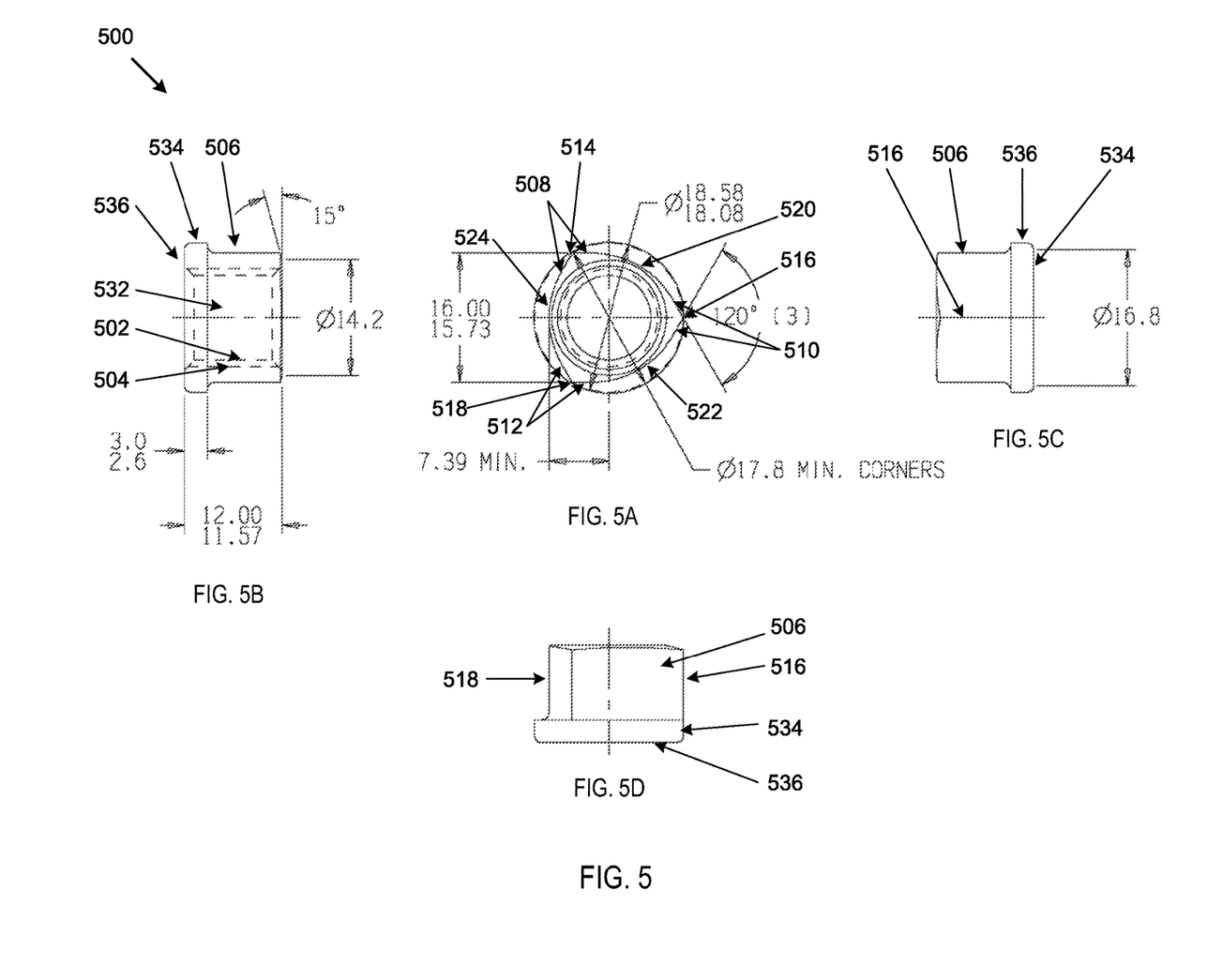
FIG. 5A is a top view of a fifth fastener embodiment.
FIG. 5B is a side view of the fifth fastener embodiment.
FIG. 5C is a side view of the fifth fastener embodiment.
FIG. 5D is an elevation view of the fifth fastener embodiment.

FIG. 5 shows another embodiment of an improved fastener. FIG. 5 includes different views of fastener 500. FIG. 5A is a top view of fastener 500. FIGS. 5B and 5C are side views of fastener 500. FIG. 5D is an elevation view of fastener 500. Fastener 500 may have the same features and components as fasteners 100, 200, and 300. The dimensions shown in FIG. 5 are exemplary and may be adjusted to meet the design requirements of the application of fastener 500. Fastener 500 may include a threaded portion 502 with internal threads with a major diameter 504 shown with a dotted line in FIG. 5A. Fastener 500 may include a bearing portion 506 with three torque bearing surfaces 508, 510, 512 that may be designed to receive torque from a tool, such as a socket or wrench, and transmit torque to the threaded portion 502. Similar to fastener 300, fastener 500 may include modified torque bearing surfaces 508, 510, 512 and modified non-torque bearing surfaces 520, 522, 524, as compared to fasteners 100 and 200.

Similar to fastener 100, each torque bearing surface 508, 510, 512 may include two torque bearing sides with an edge 514, 516, 518 between the sides. Fastener 500 may be designed and shaped to be driven by standard socket tools, such as a hexagon socket or a 12 point configuration socket. Accordingly, the angle at edges 514, 516, 518 where the torque bearing sides intersect may be approximately 120 degrees to match the angle of a standard hexagon shaped socket. Additionally, the edges 514, 516, 518 may be equally spaced around the longitudinal axis of fastener 500 to match a standard hexagon shaped socket.

Fastener 500 may have a reduced mass compared to a standard fastener of similar size due to the presence of the non-torque bearing surfaces 520, 522, 524 in place of torque bearing corners that would be located on standard fasteners. For example, the mass reduction of fastener 500 over an M12×1.75 thread×18.0 mm across flats×12.0 mm high standard hexagon nut would be approximately 36%. In grams mass, this is a reduction from 17.5 to 11.1 grams.

FIG. 5B shows opening 532 extending through the axial length of fastener 500. FIG. 5B shows threaded portion 502 with internal threads with a major diameter 504 shown with a dotted line. FIGS. 5B and 5C show that fastener 500 may include an abutment portion 534 with an abutment surface 536 designed to make contact with the surface of another component to be fastened, such as a washer or a wheel, depending on the application of fastener 500. FIG. 5D shows edges 516, 518 on bearing portion 506.

Figure 6A:
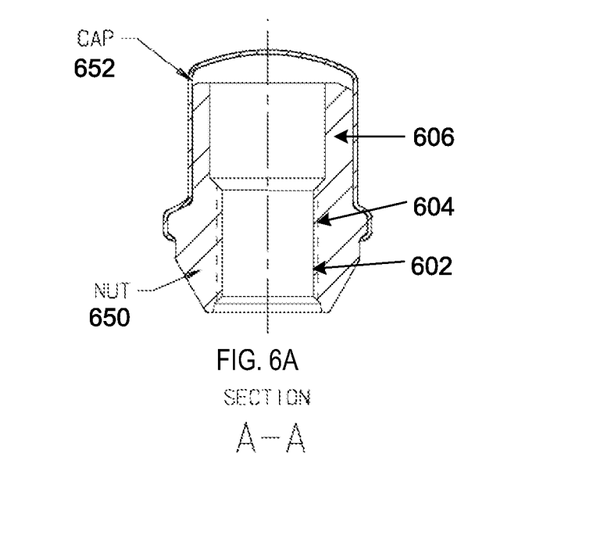
FIG. 6A is a cross-section side view of a sixth fastener embodiment.
Figure 6B:
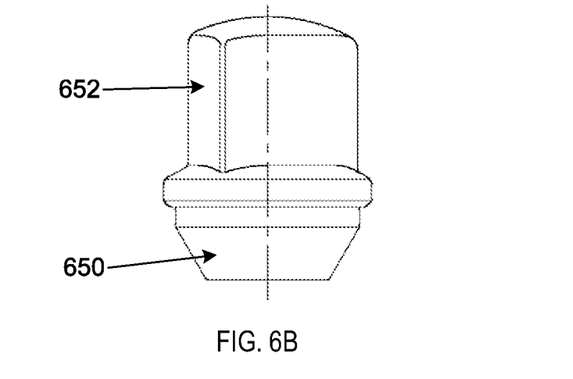
FIG. 6B is an elevation view of the sixth fastener embodiment.
Figure 6C:
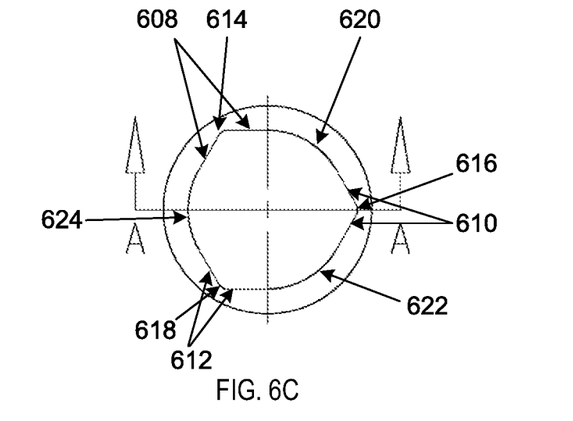
FIG. 6C is a top view of the sixth fastener embodiment.

FIG. 6 shows another embodiment of an improved fastener. Fastener 600 includes nut 650 and cap 652. Nut 650 may have the same features and components as fasteners 100, 200, and 300. Nut 650 may include a threaded portion 602 with internal threads with a major diameter 604 shown with a dotted line in FIG. 6A. Nut 650 may include a bearing portion 606 with three torque bearing surfaces 608, 610, 612, as shown in FIG. 6C, that may be designed to receive torque from a tool, such as a socket or wrench, and transmit torque to the threaded portion 602. Nut 650 may also include three non-torque bearing surfaces 620, 622, 624. The non-torque bearing surfaces 620, 622, 624 may be located adjacent to and between the torque bearing surface 608, 610, 612 such that torque bearing surface 608, 610, 612 are not adjacent to each other. Similar to fastener 300, nut 650 may include modified torque bearing surfaces 608, 610, 612 and modified non-torque bearing surfaces 620, 622, 624, as compared to fasteners 100 and 200.

Cap 652 may surround the upper portion of nut 650, including bearing portion 606 and the torque bearing surface 608, 610, 612 and the non-torque bearing surfaces 620, 622, 624. Cap 652 may fit tightly around nut 650. Accordingly, cap 652 may include similar torque bearing surfaces and non-torque bearing surfaces. Cap 652 may be crimped around nut 650. Cap 652 and its attachment to nut 650 is described in U.S. patent application Ser. No. 14/976,190, which is herein incorporated by reference in its entirety.

Similar to fasteners 100, 200, 300, 400, and 500, fastener 600 may be driven by standard socket tools, such as a hexagon socket or a 12 point configuration socket. Fastener 600 may have a reduced mass compared to a standard fastener of similar size due to the presence of the non-torque bearing surfaces 620, 622, 624 in place of torque bearing corners that would be located on standard fasteners.

While several embodiments of the fastener has been described, it should be understood that the fasteners are not so limited, and modifications may be made without departing from the disclosures herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the fastener, and it is not necessarily expected that all of the described advantages will be achieved with every embodiment of the fasteners. The scope of the disclosure is defined by the appended claims, and all devices and methods that come within the meaning of the claims, either literally or by equivalence, are intended to be embraced therein.

The invention claimed is:

1. A fastener comprising:
   a threaded portion; and
   a bearing portion, wherein the bearing portion comprises:
      exactly three bearing surfaces designed to receive torque from a tool and transmit torque to the threaded portion, wherein each bearing surface includes two adjacent sides with an edge disposed therebetween, the two adjacent sides forming an angle of approximately 120 degrees therebetween; and
      three non-bearing surfaces, wherein each of the three non-bearing surfaces has a convex curve;
   wherein each non-bearing surface is disposed between a respective two of the exactly three bearing surfaces, and
   wherein for each of the exactly three bearing surfaces, each side of the two adjacent sides is substantially planar and directly extends from an associated edge disposed between the two adjacent sides to one of the convex curves without forming any corners.

2. The fastener of claim 1, wherein the bearing surfaces are configured to receive torque from a standard socket tool and transfer torque to the threaded portion.

3. The fastener of claim 1, wherein each edge of the bearing surface is disposed opposite one of the non-bearing surfaces.

4. The fastener of claim 1, wherein the adjacent sides of each bearing surface are symmetrically disposed about the edge of the bearing surface.

5. The fastener of claim 1, wherein one of the sides of each bearing surface is parallel to only one other side of one other bearing surface.

6. The fastener of claim 5, wherein a distance between the parallel sides of the bearing surfaces is defined by a dimension determined by an industry standard.

7. The fastener of claim 1, wherein the sides of each bearing surface are flat.

8. The fastener of claim 1, wherein the edges of the bearing surfaces are equally spaced around a longitudinal axis of the fastener.

9. The fastener of claim 1, wherein each edge of the bearing surfaces are spaced 120 degrees from each other edge of the bearing surfaces.

10. The fastener of claim 1, wherein each edge of the bearing surface is disposed in the middle of each bearing surface.

11. The fastener of claim 1, wherein the threaded portion comprises internal threads.

12. The fastener of claim 1, wherein the threaded portion comprises external threads.

13. The fastener of claim 1, further comprising a cap disposed about the bearing portion, wherein the cap comprises:
three cap bearing surfaces designed to receive torque from a tool and transmit torque to the threaded portion, wherein each cap bearing surface includes two adjacent cap sides with a cap edge disposed therebetween; and
three cap non-bearing surfaces;
wherein a cap non-bearing surface is disposed between each of the cap bearing surfaces,
wherein each of the cap bearing surfaces overlies one of the bearing surfaces, and
wherein each of the cap non-bearing surfaces overlies one of the non-bearing surfaces.

14. The fastener of claim 13, wherein the fastener comprises a flange portion, the cap being pressed around the flange portion to retain the cap onto the bearing portion without welding the cap.

15. The fastener of claim 1, wherein the fastener comprises approximately 11 percent less mass than a standard fastener sized for the same application.

* * * * *